(12) United States Patent
Raia

(10) Patent No.: US 11,160,252 B2
(45) Date of Patent: Nov. 2, 2021

(54) HAND-HELD WASHING DEVICE FOR PETS

(71) Applicant: Sorin Raia, Bucharest (RO)

(72) Inventor: Sorin Raia, Bucharest (RO)

( * ) Notice: Subject to any disclaimer, the term of this patent is extended or adjusted under 35 U.S.C. 154(b) by 427 days.

(21) Appl. No.: 16/304,546

(22) PCT Filed: May 15, 2017

(86) PCT No.: PCT/RO2017/000008
§ 371 (c)(1),
(2) Date: Nov. 26, 2018

(87) PCT Pub. No.: WO2017/217880
PCT Pub. Date: Dec. 21, 2017

(65) Prior Publication Data
US 2019/0297844 A1    Oct. 3, 2019

(30) Foreign Application Priority Data
Jun. 13, 2016    (RO) .............................. a 2016 00425

(51) Int. Cl.
*A01K 13/00*    (2006.01)
(52) U.S. Cl.
CPC .................. *A01K 13/001* (2013.01)
(58) Field of Classification Search
CPC ........................ A01K 13/001; A01K 13/003
See application file for complete search history.

(56) References Cited

U.S. PATENT DOCUMENTS 2,161,047 A * 6/1939 Holden .................. A47K 3/287
  4/618
2,814,529 A    11/1957 Arnt
(Continued)

OTHER PUBLICATIONS

European Patent Office, International Search Report and Written Opinion dated Aug. 9, 2017 for PCT International Application No. PCT/RO2017/000008, international filing date May 15, 2017, priority date Jun. 13, 2016.

*Primary Examiner* — Monica L Barlow
(74) *Attorney, Agent, or Firm* — Law Office of Andrei D Popovici, PC

(57) ABSTRACT

The invention called hand washing device for pets refers to a compact self-adjusting device connected to a water supply hose, whereby any animal owner can wet, shampoo and rinse any pet using a single hand. The hand washing device for pets according to the invention consists of a Subassembly (A) cast main body containing the shampoo supply container and continuing with a feeding pipe connected also used as a handle for handling provided with a valve for closing, dosing and opening the water circuit, which can be connected to a water hose, and a Subassembly (B) consisting of two detachable hose-type arms closed at the detachable ends, laterally connected to the main body by normal screwing, wrapped in a flat spiral provided on the inner side of the winding direction with water and shampoo sprinkling holes that extend in length to an adjustable semi-elliptical shape depending on the force of the water introduced therein, resulting from clamping a wrapped arched steel strip fastened to the inside of the winding direction all over their length, which allows automatic winding of the arms after stopping the water circuit.

11 Claims, 8 Drawing Sheets

(56) References Cited

U.S. PATENT DOCUMENTS

Figure 3:
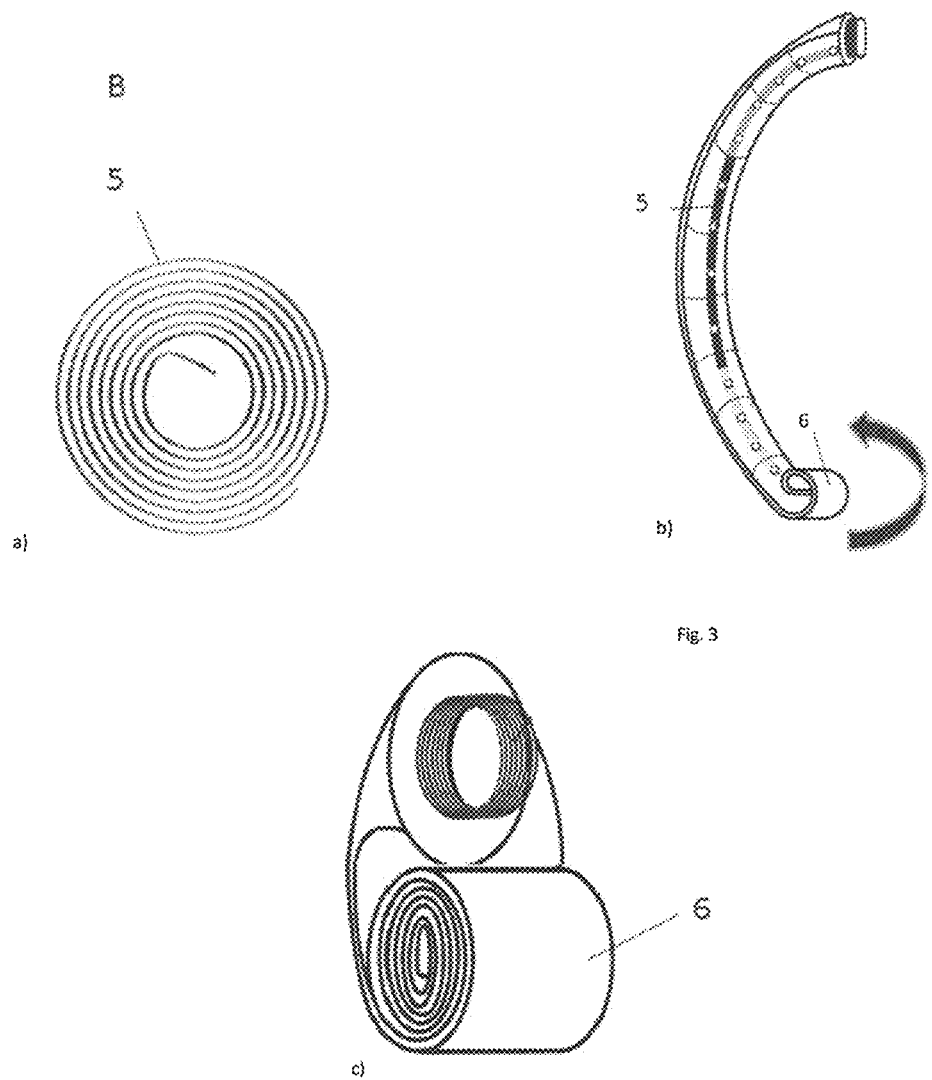

| | | | | |
|---|---|---|---|---|
| 4,903,639 | A | * | 2/1990 | Kessel ...................... A01J 7/04 |
| | | | | 119/651 |
| 5,205,306 | A | * | 4/1993 | Peterson ................ A47K 3/287 |
| | | | | 134/104.2 |
| 6,592,055 | B1 | * | 7/2003 | Marino ................. B05B 15/625 |
| | | | | 239/275 |
| 7,182,043 | B1 | | 2/2007 | Nelson |
| 9,061,299 | B1 | * | 6/2015 | Fodor ................. B05B 13/0207 |
| 10,369,578 | B2 | * | 8/2019 | Allard ..................... B05B 1/185 |
| 10,940,499 | B2 | * | 3/2021 | Pletcher .................. B05B 15/62 |
| 2002/0011259 | A1 | * | 1/2002 | Pociask ................... B08B 3/026 |
| | | | | 134/34 |
| 2004/0173163 | A1 | | 9/2004 | Bond et al. |
| 2016/0015000 | A1 | | 1/2016 | Diez |
| 2016/0095294 | A1 | * | 4/2016 | Valerio ................ A01K 13/001 |
| | | | | 119/671 |

\* cited by examiner

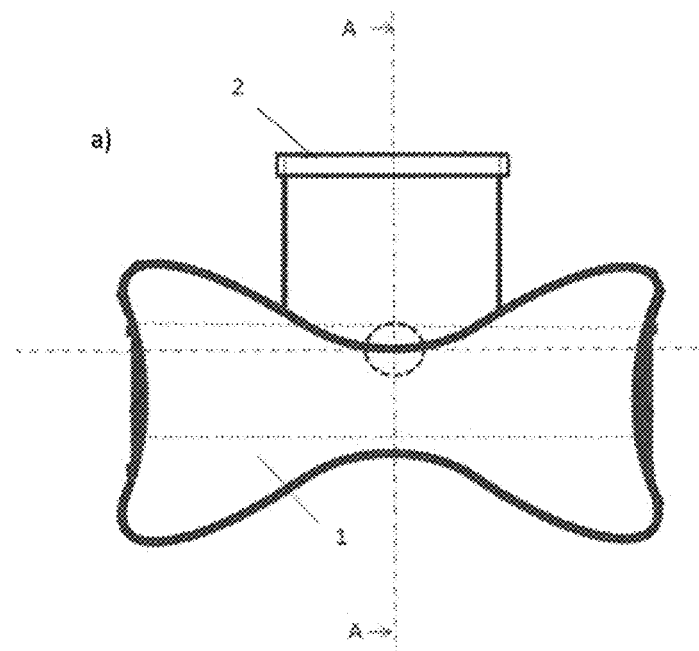
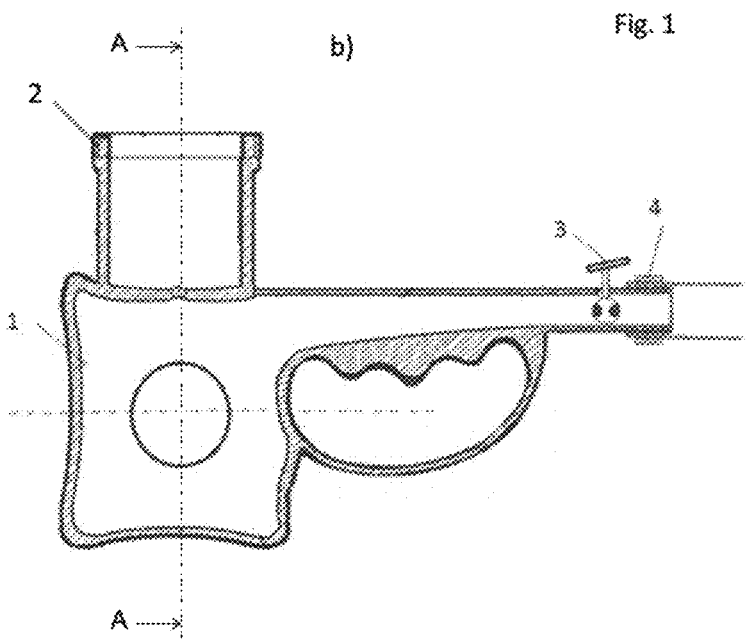
Fig. 1

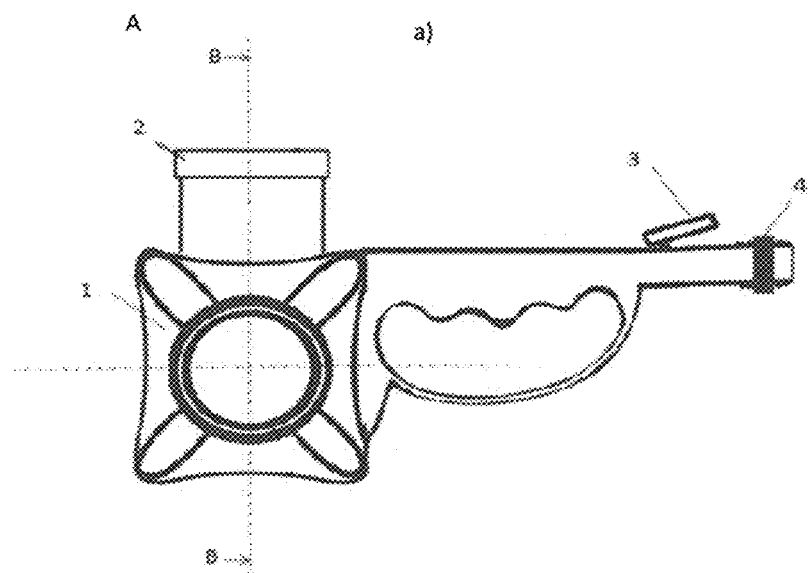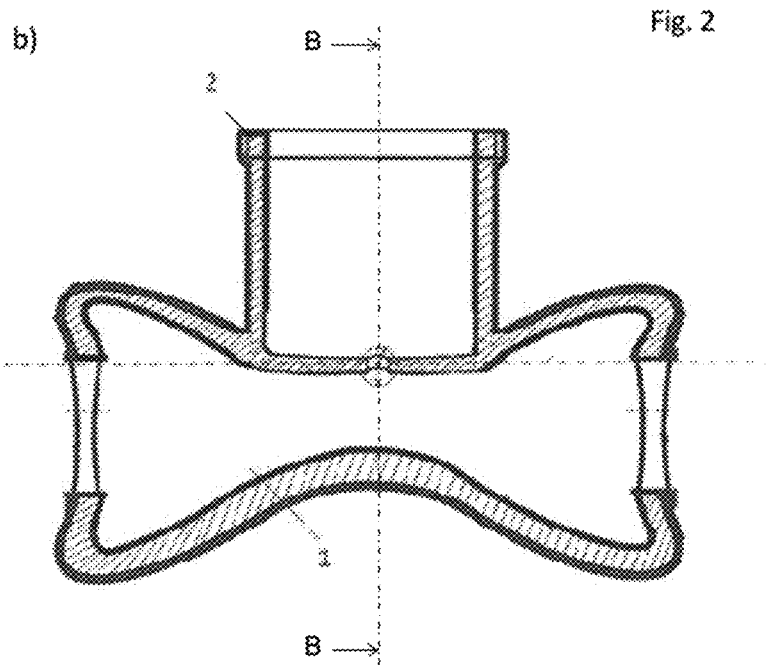
Fig. 2

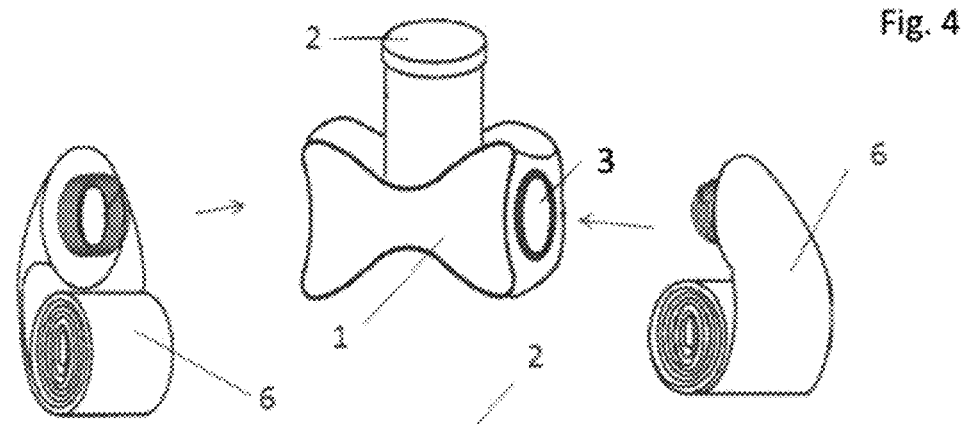
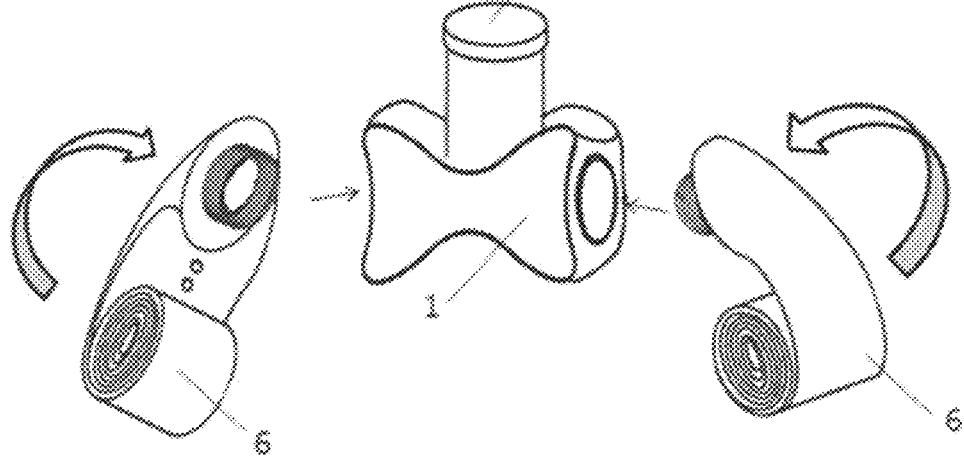
Fig. 4

A - B

HAND-HELD WASHING DEVICE FOR PETS

The invention called HAND WASHING DEVICE FOR PETS refers to a self-adjusting and self-compacting device connected to a water supply hose, whereby any animal owner can wet, shampoo and rinse any pet using a single hand.

The TECHNICAL FIELD OF USE of the invention is domestic. So far, pet owners have been using various methods to carry out the washing process of pet animals, most often the process being difficult, encountering various problems, ranging from the difficulty of immobilizing them, to the discomfort of the owners, but also of animals.

Several documents are also known, including U.S. Pat. No. 7,182,043 B1, which relates to a device for washing a pet, but the spray surface of the described device does not allow, on the one hand, the sprinkling of all parts of an animal at the same time, therefore extending the washing time, increasing the irritability of the animal, and, on the other hand, it does not allow for alternative spraying with shampoo. The document US 20040173163 A1 also describes a device that offers the possibility of shampooing the animal, but does not cover several parts of the animal at the same time. The document US 20160015000 A1 describes a device which allows both the watering and shampooing of the animal on several parts at the same time, but the device is difficult to store, not having the possibility of fully harnessing the arms, and the mechanism for selecting the water and shampoo splashing mode is also large in volume; causing difficulties in handling and storing it. As a conclusion, various innovative devices that have recently appeared on the market fail to fully satisfy an animal owner in connection with spraying, shampooing and rinsing of the animal, along with the handling and storage capabilities of the device.

Disadvantages of current methods are that:

Mechanisms used in the device construction are complex, uneasily defective and hard to replace e mechanical parts; the price of manufacturing is obviously growing.

Existing devices are unreliable, have mechanical parts or parts that can rust, corrosive and poorly resistant over time.

Requires connection to power or to pipes that develop high water pressure.

Devices are hard to install and use.

They are difficult to store, having large arms, and there is no possibility of folding or unrolling them entirely.

They are hard to clean.

They have a high weight, being hard to handle.

They cannot be used to wash any pet animal, of any size or breed, adjusting the size is a difficult option.

They are not self-adjustable and self-compacting.

The presence of this invention eliminates the disadvantages already mentioned.

The technical problem solved by the HAND WASHING DEVICE FOR PETS invention is to carry out the process of washing animals by connecting to the water hose a compact and easy-to-store device with removable, deployable and self-adjusting arms that can be used with one hand.

In principle, the HAND WASHING DEVICE FOR PETS, according to the invention, is a small device made up of a main cast body, for conveying and directing water to the dispensing blades, containing the shampoo supply container covered with a wrapper cover and continues with a feeder pipe connected to a water hose also used as a handle for handling, provided with a closing/dosing and opening valve for the water circuit. The two detachable arms, connected laterally to the main body by screwing into two threaded holes, normally embedded in the flat spiral, provided on the inner side of the wrapping direction with water and shampoo sprinkling holes, are dimensioned according to the force of the water introduced, in the form of an adjustable semi-elliptical shape, resulting in the fastening on its entire length of an embossed steel spring, fixed to the inside of the winding direction, which allows the automatic winding of the arms after closing the water circuit.

The HAND WASHING DEVICE FOR PETS can be used to clean any pet and can be used by any pet owner. The present invention can be industrially applied by manufacturing a large number of devices for sale in major stores, pet shops, in online selling websites or directly to pet owners or companies that offer this type of services.

ADVANTAGES of the invention consist of the following:

The device is durable and reliable, with no mechanical parts or parts that can rust and can be made of plastic, rubber or other materials of this type, non-corrosive and resistant.

It does not need to be connected to power or to pipes that develop high water pressure.

It is easy to install and use by any person, regardless of age.

It is easy to store, with detachable and deployable arms.

It is easy to clean.

It is lightweight, easy to handle and not dangerous.

It can be used to wash any pet animal, of any size or breed, adjusting the size by adjusting the flow of water introduced.

It has very low production costs through the reduced number of subassemblies and manufacturing parts.

It is both self-adjustable in use and self-compacting after use.

An example of manufacturing the invention called "HAND WASHING DEVICE FOR PETS" is described below, referring to FIGS. 1-6, which represent:

FIG. 1—a) Front view of the Subassembly A.

b) Section after plan A-A, shown in FIG. 1 a).

FIG. 2—a) Side view of the Subassembly A.

b) Section after plan B-B, shown in FIG. 2 a).

FIG. 3—a) Top view of the winding arch formed by the arms.

b) Perspective view of the deployable arm in extended position with positioning the holes for spraying the animal.

c) Perspective view of the deployable arm in "normal undeployed" position.

FIG. 4—a) Perspective view of the Subassemblies A and B.

b) Perspective view of the connection of the Subassembly B to the Subassembly A.

Figure 5:
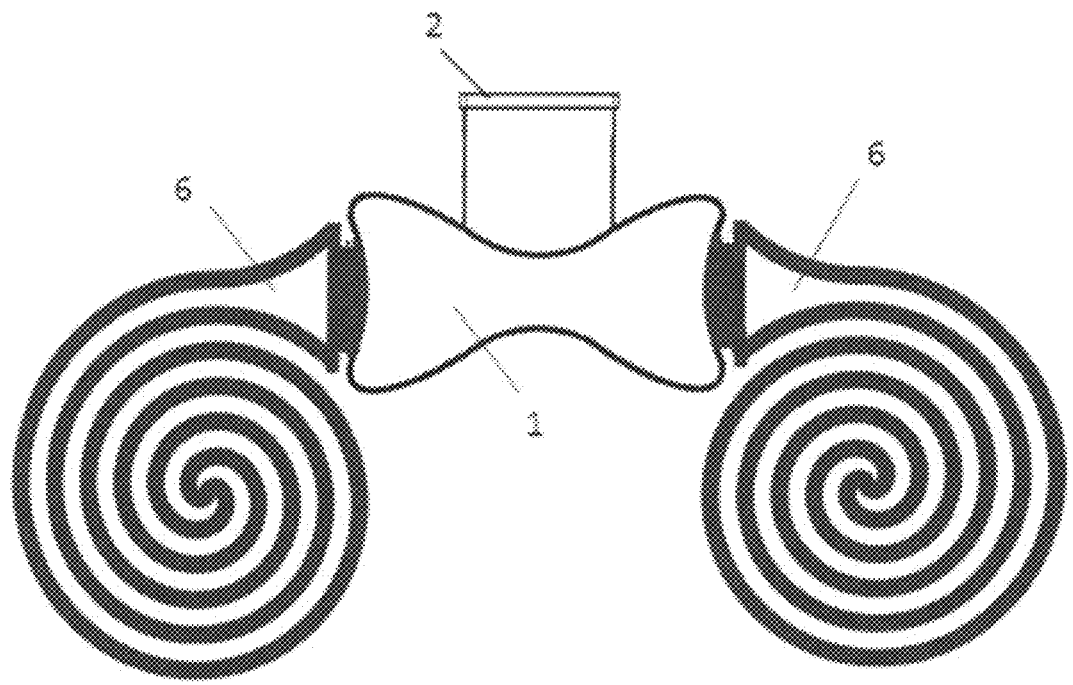

FIG. 5—Front view of the Subassembly A and the Subassembly B in "normal undeployed" position.

Figure 6:
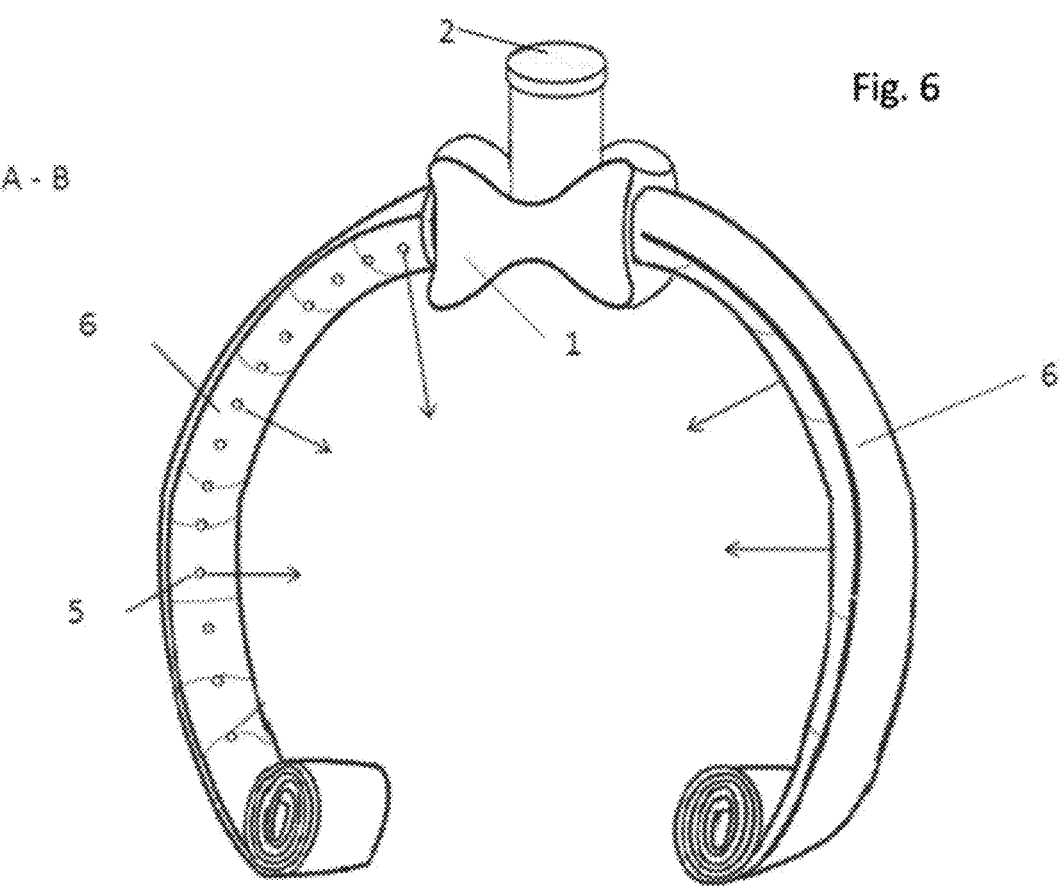

FIG. 6—Perspective view of the Subassembly A and the Subassembly B in "partially deployed" running position.

Figure 7:
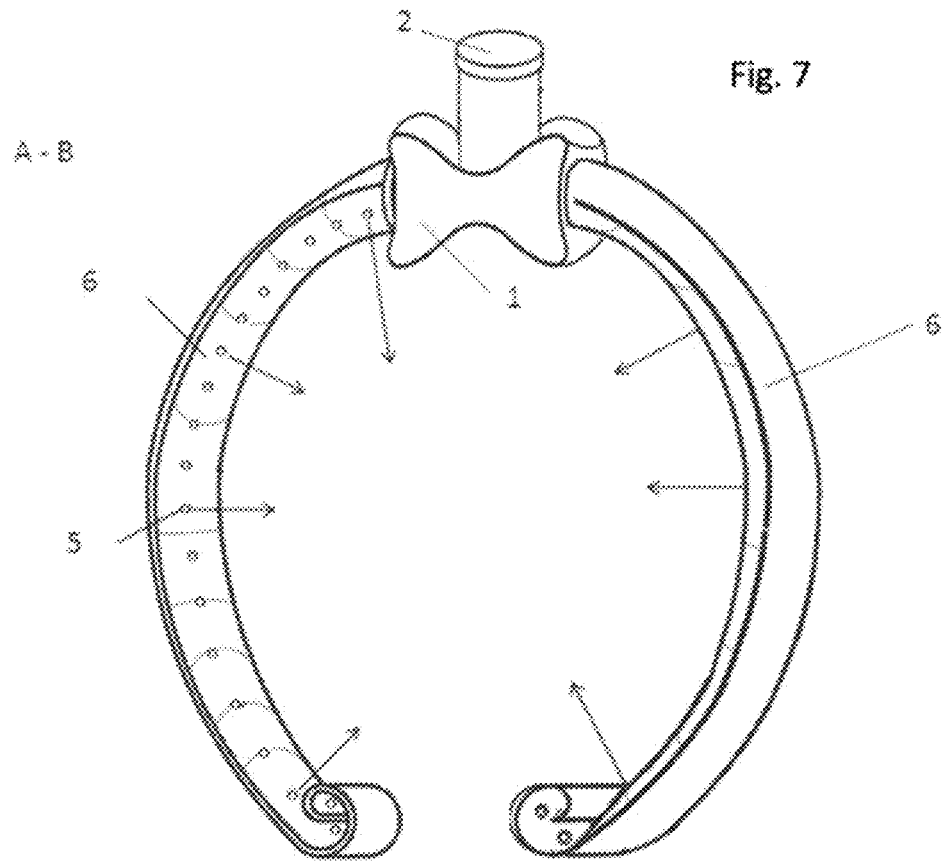

FIG. 7—Perspective view of the Subassembly A and the Subassembly B in "maximum deployed" running position.

Figure 8:
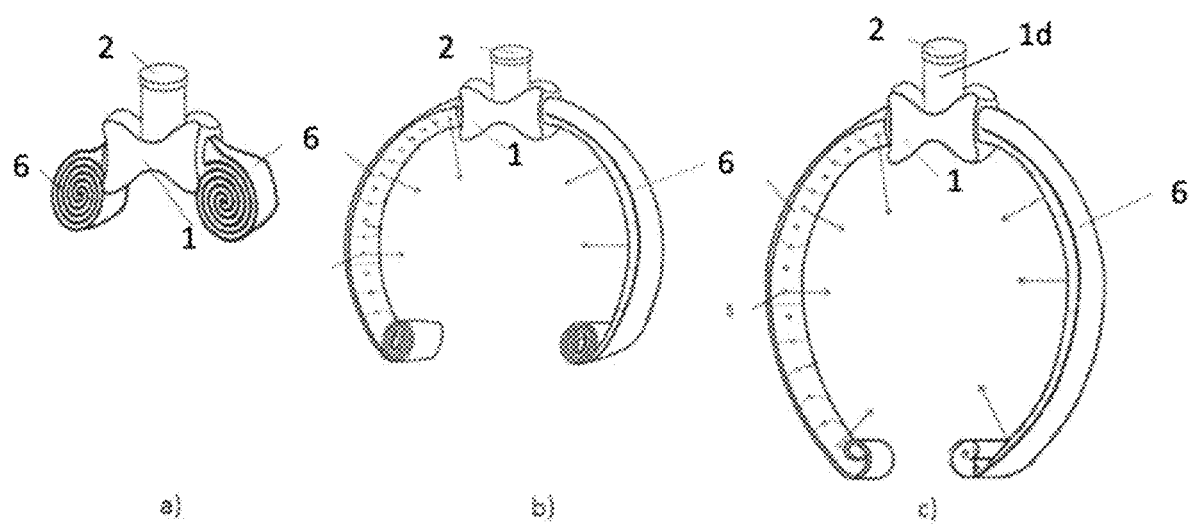

FIG. 8—a) Perspective view of the Subassembly A and the Subassembly B in "normal undeployed" position.

b) Perspective view of the Subassembly A and the Subassembly B in "partially deployed" running position.

c) Perspective view of the Subassembly A and the Subassembly B in "maximum deployed" running position.

The mentioned HAND WASHING DEVICE FOR PETS may be manipulated by any person, regardless of age and qualification in the field of animal washing, and is made up of the following main subassemblies:

1.—Subassembly A—represented by compact body made by casting or moulding a high-density plastic material such as polypropylene or high density PVC or a light non-ferrous metallic material such as aluminium which serves to receive and distribute water for washing the animal. At the top, the body forms a cylindrical cavity in which the shampoo is introduced, which has a small hole in the lower part to allow the water to mix with it, covered with an insulating cap, and in the back the body presents an extension in the form a grip handle provided with a valve for opening, dosing and closing the water circuit used to handle the washer and to connect to the water hose.

2.—Subassembly B—represented by two detachable hose-type arms closed at the deployable ends, made of a flexible material such as rubber or a waterproof fabric, laterally connected to the main body by screwing, normally wrapped in a flat spiral, provided on the inner side of the winding direction with water spraying and shampooing holes, which are adjustable according to the force of the water introduced therein, having a semi-elliptical shape, resulting from the simultaneous unfolding under tension with an arched steel strip embedded in the inner part over their entire length, which allows the automatic winding of the arms after closing the water circuit.

Subassembly A—main device—(FIG. 1) represented by a compact body #1, made by casting or moulding a resistant plastic material such as polypropylene or high density PVC or a light non-ferrous metallic material such as aluminium which serves to receive and distribute water for washing the animal. At the top, the body forms a cylindrical cavity in which the shampoo is introduced, which has a small hole in the lower part to allow the water to mix with it, provided with an external thread, in which a threaded cap #2 is screwed and in the rear part the body has an extension in the form of a grip handle provided with a valve #3 for opening, dosing and closing the water circuit, also used for handling the washing device, connected to the water hose by clamping on the main body using a bridle #4.

Subassembly B consisting of two detachable hose-type arms #6 closed at the deployable ends, provided at the top with an external thread for lateral connection in the main body by screwing into two inner threaded holes, normally wrapped in a flat spiral, provided on the inner part of the winding direction with water and shampoo sprinkling holes, which are adjustable in size depending on the force of the water introduced, having a semi-elliptical shape, resulting by the simultaneous unfolding under tension with an arched steel strip #5, normally wrapped, embedded in the inner part over their entire length, which allows the automatic winding of the arms after closing the water circuit.

The list of items with the names of the parts referenced in the drawings:

Position 1—Main body of the device.
Position 2—Unscrewable cap of the cavity for shampoo.
Position 3—Valve for opening/dosing/closing of the water flow.
Position 4—Hose bridle for clamping the water supply hose to the main body.
Position 5—Arch for winding of the detachable arms.
Position 6—Detachable deployable arms.

The invention claimed is:

1. Device for washing pets using a single hand having:
a Subassembly (A) comprising:
   a) a feeding pipe (1a) connected to a water hose, said feeding pipe (1a) being also used as a handle and being provided with a valve (3) for closing, dosing and opening a water supply;
   b) a main body (1) in fluid communication with said feeding pipe (1a), for conveying and directing water through two lateral holes (1b, 1c) provided in the main body (1);
   c) a shampoo supply container (1d) allowing admission of shampoo into the main body (1)
wherein said subassembly (A) main body (1) is a compact body (1) which forms together with said feeding pipe (1a) and with said shampoo supply container (1d), a single casted unit, and the device further comprises
a Subassembly (B) consisting of two detachable hose-type arms (6) closed at their deployable ends (6a, 6b), in fluid communication with the main body (1) via said two lateral holes (1b, 1c), said arms (6) being wrapped in a flat spiral provided on the inner side of a winding direction and extend in size depending on the force of the water introduced therein through the main body (1), said hose-type arms having an adjustable semi-elliptical shape resulting from unrolling at the same time with an arched steel strip (5) wrapped and fastened to the inside of the winding direction all over the detachable hose-type arms' (6) length, said arched steel strip (5) allowing self-winding of the arms (6) after closing the water supply and, said arms (6) being provided on their inner side with water and shampoo sprinkling holes (7).

2. Device for washing pets using a single hand according to claim 1 wherein said main body (1) is made by casting a resistant plastic material or a light non-ferrous metallic material.

3. Device for washing pets using a single hand according to claim 1 wherein said detachable hose-type arms (6) are made of a flexible material or a waterproof fabric.

4. Device for washing pets using a single hand according to claim 1 wherein said detachable hose-type arms (6) are provided at their top end (6c, 6d) with means for connection to the main body (1).

5. Device for washing pets using a single hand according to claim 4 wherein said top ends (6c, 6d) of said detachable hose-type arms (6) are connected to said lateral holes (1b, 1c) of the main body (1) via male and female threading.

6. Device for washing pets using a single hand according to claim 1 wherein said shampoo supply container (1d) has a cap (2).

7. Device for washing pets using a single hand according to claim 6 wherein said shampoo supply container (1d) has a cylindrical shape.

8. Device for washing pets using a single hand according to claim 7 wherein said shampoo supply container (1d) is provided at its top part with a male thread to couple said cap (2) via female threading.

9. Device for washing pets using a single hand according to claim 1 wherein said feeding pipe (1a) is connected to a water hose by means of a clamping bridle (4).

10. Device for washing pets using a single hand according to claim 1 wherein said compact cast main body (1) has a shaped profile, preferably a biconcave shaped profile, which is symmetrically arranged with respect to a vertical plane perpendicular to a longitudinal axis running through the centre of said lateral holes (1b, 1c), which are preferably circular lateral holes (1b, 1c).

11. Device for washing pets using a single hand according to claim 1 wherein said arched steel strip (5) is a polycurve, preferably comprising at least two curved segments joined together.

* * * * *